(12) United States Patent
Dai et al.

(10) Patent No.: US 12,124,009 B2
(45) Date of Patent: Oct. 22, 2024

(54) OPTICAL IMAGING LENS GROUP

(71) Applicant: ZHEJIANG SUNNY OPTICS CO., LTD., Zhejiang (CN)

(72) Inventors: Fujian Dai, Yuyao (CN); Jianke Wenren, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 730 days.

(21) Appl. No.: 17/341,107

(22) Filed: Jun. 7, 2021

(65) Prior Publication Data
US 2022/0011553 A1 Jan. 13, 2022

(30) Foreign Application Priority Data

Jul. 8, 2020 (CN) .......................... 202010651182.4

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .............................. G02B 13/0045; G02B 9/64
See application file for complete search history.

(56) References Cited

U.S. PATENT DOCUMENTS

| 2011/0002051 | A1* | 1/2011 | Hsu | G02B 13/16 |
| | | | | 359/717 |
| 2020/0012078 | A1* | 1/2020 | Kuo | G02B 13/18 |
| 2020/0073092 | A1* | 3/2020 | Chen | G02B 13/18 |
| 2020/0209543 | A1* | 7/2020 | Kim | G02B 9/64 |
| 2021/0157096 | A1* | 5/2021 | Hirano | H04N 23/55 |
| 2021/0191082 | A1* | 6/2021 | Zhang | G02B 9/64 |

OTHER PUBLICATIONS

Michel Thoby, How is Lens Distortion Value Being Defined by the Industry and by some International Standardization Groups, 2018, pp. 1-8 [online], [retrieved Aug. 1, 2023], retrieved from Internet <URL: http://michel.thoby.free.fr/Fisheye_history_short/International_Standards_about_Distortion.html>. (Year: 2018).*

* cited by examiner

*Primary Examiner* — Ephrem Z Mebrahtu
(74) *Attorney, Agent, or Firm* — Birch, Stewart, Kolasch & Birch, LLP

(57) ABSTRACT

The present application discloses an optical imaging lens group, including a first lens, a second lens, a third lens, a fourth lens, a fifth lens, a sixth lens, a seventh lens and an eighth lens having refractive powers in order from an object side to an image side along an optical axis. The first lens has a negative refractive power. The fourth lens has a positive refractive power. The eighth lens has a negative refractive power. At least one of the first lens to the eighth lens has a non-rotationally symmetrical aspherical lens surface, and the maximum TV distortion TDT in an imaging range of the optical imaging lens group satisfies: $|TDT| \leq 3.5\%$.

18 Claims, 3 Drawing Sheets

OPTICAL IMAGING LENS GROUP

CROSS REFERENCE TO RELATED APPLICATIONS

The present application claims the priority of Chinese patent application No. 202010651182.4, filed on Jul. 8, 2020, which is hereby incorporated by reference in its entirety.

TECHNICAL FIELD

The present application relates to the field of optical elements, and specifically to an optical imaging lens group.

TECHNICAL BACKGROUND

In recent years, with the rapid development of technologies in the fields of optics, electronics, materials etc., various electronic products have gradually entered millions of households and have become an indispensable part of people's lives. Among them, photographic electronic products are even more taking this opportunity to flourish. The photographic works of photographic electronic products have become an important carrier for people to record their personal lives and precious moments. An electronic product with a powerful photography function will undoubtedly be favored by consumers.

However, in an ideal optical imaging system, the traditional rotationally symmetrical aspherical surface can well correct the aberrations of the tangential and sagittal planes. However, in the actual optical imaging system for wide-beam imaging, as the image surface size increases, the off-axis aberration is difficult to be corrected equally.

SUMMARY

The present application provides an optical imaging lens group, comprising a first lens, a second lens, a third lens, a fourth lens, a fifth lens, a sixth lens, a seventh lens and an eighth lens having refractive powers in order from an object side to an image side along an optical axis, wherein the first lens has a negative refractive power; the fourth lens has a positive refractive power; the eighth lens has a negative refractive power; at least one of the first lens to the eighth lens has a non-rotationally symmetrical aspherical lens surface; and the maximum TV distortion TDT in an imaging range of the optical imaging lens group may satisfy: $|TDT| \leq 3.5\%$.

In an implementation, there is at least one rotationally symmetrical aspherical lens surface from an object side surface of the first lens to an image side surface of the eighth lens.

In an implementation, an image height IHx in an X-axis direction of the optical imaging lens group and an image height IHy in a Y-axis direction of the optical imaging lens group may satisfy: $\sqrt{IH_x^2 + IH_y^2} \leq 4.0$ mm.

In an implementation, a semi-field of view Semi-FOVx in the X-axis direction of the optical imaging lens group and a semi-field of view Semi-FOVy in the Y-axis direction of the optical imaging lens group may satisfy: tan(Semi-FOVy)/tan(Semi-FOVx)<2.0.

In an implementation, values of effective radii of respective lens surfaces of an object side surface of the first lens to an image side surface of the fourth lens in the Y-axis direction of the optical imaging lens group decrease in order; and values of effective radii of respective lens surfaces of an image side surface of the fourth lens to an image side surface of the eighth lens in the Y-axis direction of the optical imaging lens group increase in order.

In an implementation, the maximum effective radius DT11 of an object side surface of the first lens in the Y-axis direction of the optical imaging lens group, the maximum effective radius DT42 of an image side surface of the fourth lens in the Y-axis direction of the optical imaging lens group and an effective radius DT82 of an image side surface of the eighth lens may satisfy: $1 < (DT11 - DT42)/(DT82 - DT42) \leq 1.2$.

In an implementation, a refractive index N2 of the second lens in the Y-axis direction of the optical imaging lens group and a refractive index N3 of the third lens in the Y-axis direction of the optical imaging lens group may satisfy: $1.6 < (N2+N3)/2 < 1.7$.

In an implementation, an Abbe number V2 of the second lens in the Y-axis direction of the optical imaging lens group and an Abbe number V3 of the third lens in the Y-axis direction of the optical imaging lens group may satisfy: $|V2-V3| \leq 20$.

In an implementation, an Abbe number V6 of the sixth lens in the Y-axis direction of the optical imaging lens group, an Abbe number V7 of the seventh lens in the Y-axis direction of the optical imaging lens group and an Abbe number V8 of the eighth lens in the Y-axis direction of the optical imaging lens group may satisfy: $50 < (V6+V7+V8)/3 < 60$.

In an implementation, a refractive index N6 of the sixth lens in the Y-axis direction of the optical imaging lens group, a refractive index N7 of the seventh lens in the Y-axis direction of the optical imaging lens group and a refractive index N8 of the eighth lens in the Y-axis direction of the optical imaging lens group may satisfy: $1.5 < (N6+N7+N8)/3 < 1.6$.

In an implementation, an effective focal length f1y of the first lens in the Y-axis direction and a total effective focal length fy of the optical imaging lens group in the Y-axis direction may satisfy: $-3.0 < f1y/fy < -2.0$.

In an implementation, an effective focal length f4y of the fourth lens in the Y-axis direction and an effective focal length f6y of the sixth lens in the Y-axis direction may satisfy: $3.5 < f6y/f4y < 5.0$.

In an implementation, an effective focal length f1y of the first lens in the Y-axis direction and an effective focal length f8y of the eighth lens in the Y-axis direction may satisfy: $3.0 f1y/f8y < 4.0$.

In an implementation, a total effective focal length fx of the optical imaging lens group in the X-axis direction and a total effective focal length fy of the optical imaging lens group in the Y-axis direction may satisfy: $1.0 < fx/fy < 1.5$.

The present application provides an optical imaging lens group, comprising a first lens, a second lens, a third lens, a fourth lens, a fifth lens, a sixth lens, a seventh lens and an eighth lens having refractive powers in order from an object side to an image side along an optical axis, wherein the first lens has a negative refractive power; the fourth lens has a positive refractive power; the eighth lens has a negative refractive power; at least one of the first lens to the eighth lens has a non-rotationally symmetrical aspherical lens surface; and an image height IHx in an X-axis direction of the optical imaging lens group and an image height IHy in a Y-axis direction of the optical imaging lens group may satisfy: $\sqrt{IH_x^2 + IH_y^2} \leq 4.0$ mm.

In the present application, eight lenses are adopted. The refractive power, surface shape and center thickness of each lens, the on-axis distances between the respective lenses, and the like are reasonably distributed, so that the above-mentioned optical imaging system has at least one beneficial effect of small distortion, low aberration, good imaging quality and so on.

BRIEF DESCRIPTION OF THE DRAWINGS

Other features, objectives, and advantages of the present application will become more apparent by reading a detailed description of non-restrictive embodiments made with reference to the following drawings.

DETAILED DESCRIPTION OF THE EMBODIMENTS

Figure 1:
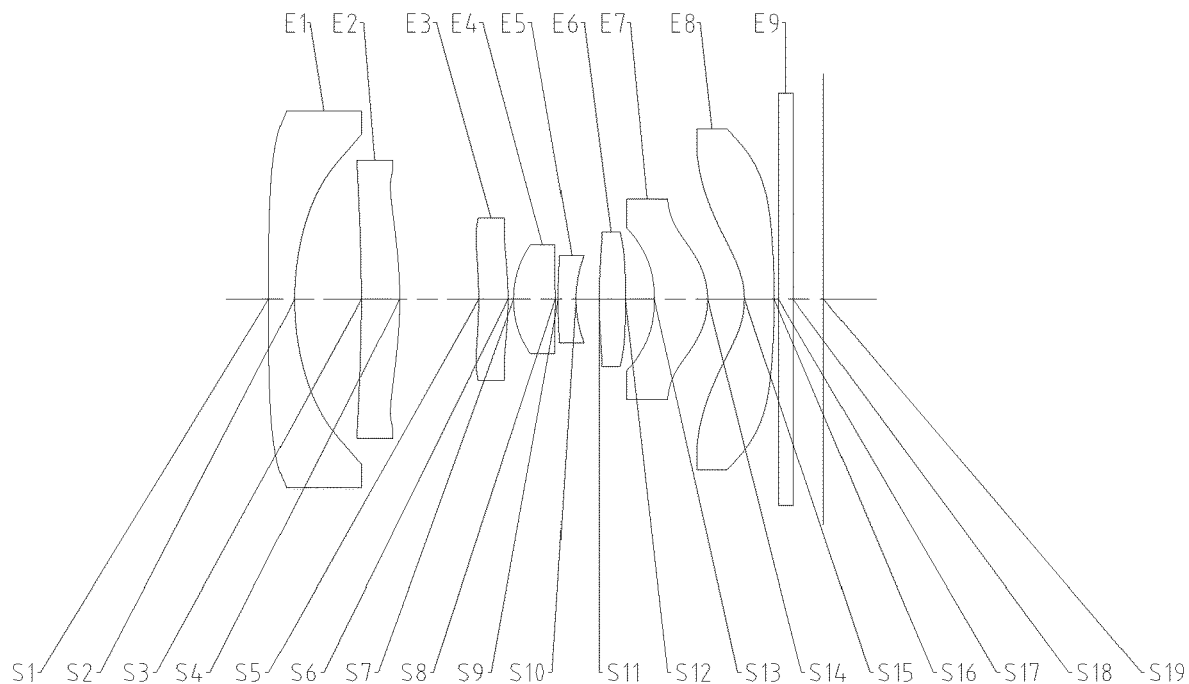
FIG. 1 shows a schematic structural diagram of an optical imaging lens group according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspherical surfaces are not limited to those shown in the drawings. The drawings are only examples and are not drawn strictly to scale.

In the context, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred as an object side surface of the lens, and a surface of each lens closest to an imaging plane is referred as an image side surface of the lens.

In the context, a direction parallel to an optical axis is defined as a Z-axis direction, a direction perpendicular to the Z-axis and located in a tangential plane is defined as a Y-axis direction, and a direction perpendicular to the Z-axis and located in a sagittal plane is defined as an X-axis direction. Unless otherwise specified, all the parameter symbols (for example, radius of curvature, etc.) other than those related to the field of view herein represent characteristic parameter values along the Y-axis direction of the optical imaging lens group. For example, unless otherwise specified, fx represents a radius of curvature in the X-axis direction of the optical imaging lens group, and fy represents a radius of curvature in the Y-axis direction of the optical imaging lens group.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical imaging lens group according to an exemplary implementation of the present application may include eight lenses having refractive powers, which are a first lens, a second lens, a third lens, a fourth lens, a fifth lens, a sixth lens, a seventh lens and an eighth lens, respectively. The eight lenses are arranged in order from an object side to an image side along an optical axis. There may be a separation distance between any two adjacent lenses of the first lens to the eighth lens.

In an exemplary implementation, the first lens may have a negative refractive power; the second lens may have a positive refractive power or a negative refractive power; the third lens may have a positive refractive power or a negative refractive power; the fourth lens may have a positive refractive power; the fifth lens may have a positive refractive power or a negative refractive power; the sixth lens may have a positive refractive power or a negative refractive power; the seventh lens may have a positive refractive power or a negative refractive power; and the eighth lens may have a negative refractive power.

In an exemplary implementation, the first lens has a negative refractive power and has a divergent effect on light, which is helpful to increase the field of view of the system and increase the object photographing space of the system. It is mounted with the fourth lens having a positive refractive power, and is integrated with the second lens and the third lens, which can balance the field curvature of the system and optimize the chromatic spherical aberration of the system, and at the same time, can make the light transition smoothly. It is mounted with the fifth lens, the sixth lens, the seventh lens and the eighth lens having a negative refractive power, which can make the overall lens structure group have a double Gaussian structure, and can comprehensively correct the aberration of the system while ensuring the smooth and stable propagation of light.

In an exemplary implementation, at least one of the first lens to the eighth lens may have a non-rotationally symmetrical aspherical surface. At least one of the first lens to the eighth lens has a non-rotationally symmetrical aspherical structure, which can improve the system's ability to optimize the degree of freedom, and is helpful to reasonably distribute the refractive power in the X-axis direction and the Y-axis direction, and correct the system's distortion.

In an exemplary implementation, the optical imaging lens group according to the present application may satisfy: $|TDT| \leq 3.5\%$, where TDT is the maximum TV distortion in an imaging range of the optical imaging lens group. By satisfying $|TDT| \leq 3.5\%$, the TV distortion can be smaller than the range of the human eye to distinguish the image, which is of great significance to the design of the optical system.

In an exemplary implementation, the optical imaging lens group according to the present application may satisfy: $\sqrt{IH_x^2 + IH_y^2} \leq 4.0$ mm, where IHx is an image height in the X-axis direction of the optical imaging lens group, and IHy is an image height in the Y-axis direction of the optical imaging lens group. More specifically, IHx and IHy may further satisfy: $\sqrt{IH_x^2 + IH_y^2} \leq 3.4$ mm. By satisfying $\sqrt{IH_x^2 + IH_y^2} \leq 4.0$ mm, the size of the image surface of the system can be controlled within a certain range, and thus the structural size of the system has a certain proportion, which is convenient to be installed in the lens and is helpful to cooperate with the imaging chip.

In an exemplary implementation, the optical imaging lens group according to the present application may satisfy: tan(Semi-FOVy)/tan(Semi-FOVx)<2.0, where Semi-FOVx is a semi-field of view in the X axis direction of the optical imaging lens group, and Semi-FOVy is a semi-field of view in the Y-axis direction of the optical imaging lens group. More specifically, Semi-FOVy and Semi-FOVx may further satisfy: tan(Semi-FOVy)/tan(Semi-FOVx)<1.8. By satisfying tan(Semi-FOVy)/tan(Semi-FOVx)<2.0, it is helpful to distribute the refractive power of the system in the X-axis direction and the Y-axis direction. By reasonably distributing the refractive power of the system, it is helpful to correct the distortion of the system, and make the field of view in the X-axis direction and Y-axis direction form a certain compression ratio.

In an exemplary implementation, the values of effective radii of respective lens surfaces of an object side surface of the first lens to an image side surface of the fourth lens in the Y-axis direction of the optical imaging lens group decrease in order; and the values of effective radii of respective lens surfaces of an image side surface of the fourth lens to an image side surface of the eighth lens in the Y-axis direction of the optical imaging lens group increase in order. This is helpful to make the optical imaging lens group have a symmetrical double Gaussian structure, facilitating the correction of the aberration of the system.

In an exemplary implementation, the optical imaging lens group according to the present application may satisfy: 1<(DT11−DT42)/(DT82−DT42)≤1.2, where DT11 is the maximum effective radius of the object side surface of the first lens in the Y-axis direction of the optical imaging lens group, DT42 is the maximum effective radius of the image side surface of the fourth lens in the Y-axis direction of the optical imaging lens group, and DT82 is an effective radius of the image side surface of the eighth lens. By satisfying 1<(DT11−DT42)/(DT82−DT42)≤1.2, the proportional size of the overall optical structure of the system can be controlled within a certain range, and other lenses can be mounted for imaging. The overall optical structure shape of the system is determined, which is helpful to optimize the process performance.

In an exemplary implementation, the optical imaging lens group according to the present application may satisfy: 1.6<(N2+N3)/2<1.7, where N2 is a refractive index of the second lens in the Y-axis direction of the optical imaging lens group, and N3 is a refractive index of the third lens in the Y-axis direction of the optical imaging lens group. By satisfying 1.6<(N2+N3)/2<1.7, it is helpful to ensure a smooth transition of light. On the basis that the second lens and the third lens have a certain structure, the refractive index of the second lens and the third lens is restricted to distribute the refractive power, which is helpful to correct the spherical aberration of the system.

In an exemplary implementation, the optical imaging lens group according to the present application may satisfy: $|V2-V3| \leq 20$, where V2 is an Abbe number of the second lens in the Y-axis direction of the optical imaging lens group, and V3 is an Abbe number of the third lens in the Y-axis direction of the optical imaging lens group. By satisfying $|V2-V3| \leq 20$, it is helpful to eliminate the chromatic aberration of the system.

In an exemplary implementation, the optical imaging lens group according to the present application may satisfy: 50<(V6+V7+V8)/3<60, where V6 is an Abbe number of the sixth lens in the Y-axis direction of the optical imaging lens group, V7 is an Abbe number of the seventh lens in the Y axis direction of the optical imaging lens group, and V8 is an Abbe number of the eighth lens in the Y axis direction of the optical imaging lens group. More specifically, V6, V7, and V8 may further satisfy: 54.6<(V6+V7+V8)/3<58.1. By satisfying 50<(V6+V7+V8)/3<60, the chromatic aberration of the system can be corrected.

In an exemplary implementation, the optical imaging lens group according to the present application may satisfy: 1.5<(N6+N7+N8)/3<1.6, where N6 is a refractive index of the sixth lens in the Y-axis direction of the optical imaging lens group, N7 is a refractive index of the seventh lens in the Y-axis direction of the optical imaging lens group, and N8 is a refractive index of the eighth lens in the Y-axis direction of the optical imaging lens group. By satisfying 1.5<(N6+N7+N8)/3<1.6, the corresponding refractive power can be distributed reasonably, which is helpful to correct the field curvature of the system.

In an exemplary implementation, the optical imaging lens group according to the present application may satisfy: −3.0<f1y/fy<−2.0, where f1y is an effective focal length of the first lens in the Y-axis direction, and fy is a total effective focal length of the optical imaging lens group in the Y-axis direction. More specifically, f1y and fy may further satisfy: −2.8<f1y/fy<−2.5. By satisfying −3.0<f1y/fy<−2.0, that the degree of non-rotational symmetry of the aspherical surface of the first lens can be changed, which is helpful to correct the distortion in the Y-axis direction that is not completely corrected after imaging by an integration of other lenses. In an exemplary implementation, the optical imaging lens group according to the present application may satisfy: 3.5<f6y/f4y<5.0, where f4y is an effective focal length of the fourth lens in the Y-axis direction, and f6y is an effective focal length of the sixth lens in the Y-axis direction. More specifically, f6y and f4y may further satisfy: 3.8<f6y/f4y<4.2. By satisfying 3.5<f6y/f4y<5.0, the refractive power in the Y-axis direction can be distributed by optimizing the degree of non-rotational symmetry of aspherical surfaces of the fourth lens and the sixth lens, and thus the imaging difference between the actual imaging point and the ideal imaging point in the Y-axis direction can be reduced, thereby correcting the aberration in the Y-axis direction.

In an exemplary implementation, the optical imaging lens group according to the present application may satisfy: 3.0≤f1y/f8y<4.0, where f1y is the effective focal length of the first lens in the Y-axis direction, and f8y is an effective focal length of the eighth lens in the Y-axis direction. More specifically, f1y and f8y may further satisfy: 3.0≤f1y/f8y<3.7. By satisfying 3.0≤f1y/f8y<4.0, the aberration in the Y-axis direction of the system can be corrected, and at the same time, the first lens and the eighth lens can have a certain degree of non-rotational symmetry.

In an exemplary implementation, the optical imaging lens group according to the present application may satisfy: 1.0<fx/fy<1.5, where fx is a total effective focal length of the optical imaging lens group in the X-axis direction, and fy is a total effective focal length of the optical imaging lens group in the Y-axis direction. More specifically, fx and fy may further satisfy: 1.0<fx/fy<1.5. By satisfying 1.0<fx/fy<1.5, a ratio difference between the X-axis direction and the Y-axis direction can be realized in an image of a specific ratio, meeting the special requirements for image stretching or compression, and achieving a non-rotationally symmetrical image quality state.

In an exemplary implementation, the optical imaging lens group according to the present application further includes a diaphragm disposed between the fourth lens and the fifth lens. Optionally, the optical imaging lens group described above may further include a filter for correcting color deviation and/or protective glass for protecting a photosensitive element located on an imaging plane.

The optical imaging lens group according to the above-mentioned implementations of the present application may adopt multiple lens, for example, eight lens described above. The refractive power, surface shape and center thickness of each lens, the on-axis distances between the respective lenses, and the like, are reasonably distributed, which can effectively reduce the volume of the optical imaging lens group and improve the processability of the optical imaging lens group, so that the optical imaging lens group is more advantageous for production and is applicable for portable electronic products. The optical imaging lens group configured as described above may have, for example, the characteristics of small distortion, good imaging quality and so on.

In the implementations of the present application, at least one of lens surfaces of the respective lenses is an aspherical lens surface, that is, at least one lens surface of the object side surface of the first lens to the image side surface of the eighth lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. After the aspherical lens is adopted, the aberrations that occur during imaging can be eliminated as much as possible, thereby improving the imaging quality. Optionally, at least one of an object side surface and an image side surface of each of the first lens, the second lens, the third lens, the fourth lens, the fifth lens, the sixth lens, the seventh lens and the eighth lens is an aspherical lens surface. Optionally, both an object side surface and an image side surface of each of the first lens, the second lens, the third lens, the fourth lens, the fifth lens, the sixth lens, the seventh lens and the eighth lens are aspherical lens surfaces.

However, it should be understood by those skilled in the art that the number of lenses constituting the optical imaging lens group can be changed without departing from the technical solution claimed in the present application, to obtain respective results and advantages described in the description. For example, although eight lenses have been described in the implementations as an example, the optical imaging lens group is not limited to including the eight lenses. If necessary, the optical imaging lens group may also include other numbers of lenses.

Specific embodiments of the optical imaging lens group applicable to the above-mentioned implementations will be further described below with reference to the drawings.

Embodiment 1

An optical imaging lens group according to Embodiment 1 of the present application will be described below with reference to FIGS. 1 to 3. FIG. 1 shows a schematic structural diagram of the optical imaging lens group according to Embodiment 1 of the present application.

As shown in FIG. 1, the optical imaging lens group includes a first lens E1, a second lens E2, a third lens E3, a fourth lens E4, a fifth lens E5, a sixth lens E6, a seventh lens E7, an eighth lens E8, a filter E9 and an imaging plane S19 in order from an object side to an image side.

The first lens E1 has a negative refractive power, and has a convex object side surface S1 and a concave image side surface S2. The second lens E2 has a positive refractive power, and has a concave object side surface S3 and a convex image side surface S4. The third lens E3 has a positive refractive power, and has a concave object side surface S5 and a convex image side surface S6. The fourth lens E4 has a positive refractive power, and has a convex object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a positive refractive power, and has a concave object side surface S13 and a convex image side surface S14. The eighth lens E8 has a negative refractive power, and has a concave object side surface S15 and a convex image side surface S16. The filter E9 has an object side surface S17 and an image side surface S18. Light from an object sequentially passes through the respective surfaces S1 to S18 and finally forms an image on the imaging plane S19.

Table 1 shows a table of basic parameters of the optical imaging lens group of Embodiment 1, wherein the units of the radius of curvature Y, radius of curvature X, thickness/distance, and focal length Y are all millimeters (mm).

TABLE 1

| Surface No. | Surface type | Radius of curvature Y | Radius of curvature X | Thickness/ distance | Material Refractive index | Material Dispersion coefficient | Focal length Y | Conic coefficient Y | Conic coefficient X |
|---|---|---|---|---|---|---|---|---|---|
| OBJ | Spherical | Infinity | | Infinity | | | | | |
| S1(AAS) | Aspherical | 77.0729 | Infinity | 0.3740 | 1.518 | 67.46 | −8.38 | 544.1770 | 0.0000 |
| S2(AAS) | Aspherical | 4.1012 | Infinity | 0.9722 | | | | 0.1257 | 0.0000 |
| S3(AAS) | Aspherical | −22.8603 | Infinity | 0.5572 | 1.655 | 33.78 | 13.01 | −145.9412 | 0.0000 |
| S4(AAS) | Aspherical | −6.2685 | Infinity | 1.1489 | | | | −20.3121 | 0.0000 |
| S5(AAS) | Aspherical | −6.1103 | Infinity | 0.4260 | 1.654 | 50.35 | 44.69 | −40.9892 | 0.0000 |
| S6(AAS) | Aspherical | −5.1929 | Infinity | 0.0800 | | | | −29.2021 | 0.0000 |
| S7 | Aspherical | 1.5126 | | 0.6058 | 1.546 | 65.13 | 2.24 | 0.0000 | |
| S8(STO) | Aspherical | −71.4558 | | 0.0413 | | | | 0.0000 | |
| S9 | Aspherical | 18.1204 | | 0.2519 | 1.663 | 32.85 | −3.07 | 0.0000 | |
| S10 | Aspherical | 1.6686 | | 0.3372 | | | | 0.0000 | |
| S11 | Aspherical | 7.8441 | | 0.3827 | 1.564 | 63.80 | 9.24 | 0.0000 | |
| S12 | Aspherical | −4.7972 | | 0.4219 | | | | 0.0000 | |
| S13 | Aspherical | −1.3361 | | 0.7741 | 1.552 | 48.45 | 3.3 | 0.0000 | |
| S14 | Aspherical | −1.8749 | | 0.5364 | | | | 0.0000 | |
| S15 | Aspherical | −5.0885 | | 0.4492 | 1.532 | 51.94 | −2.31 | 0.0000 | |
| S16 | Aspherical | −5.3475 | | 0.0462 | | | | 0.0000 | |
| S17 | Spherical | Infinity | | 0.2100 | 1.518 | 64.17 | | | |
| S18 | Spherical | Infinity | | 0.4400 | | | | | |
| S19 | Spherical | Infinity | | | | | | | |

It should be understood that the "radius of curvature X" and "conic coefficient X" that are not specifically marked (blank) in the above table are consistent with the corresponding values of "radius of curvature Y" and "conic coefficient Y". This is similar in the following embodiments.

In this example, a total effective focal length fx of the optical imaging lens group in the X-axis direction is 3.95 mm, a total effective focal length fy of the optical imaging lens group in the Y-axis direction is 3.12 mm, and a distance TTL from the object side surface S1 of the first lens E1 to the imaging plane S19 of the optical imaging lens group on the optical axis is 8.06 mm.

In Embodiment 1, both the object side surface and image side surface of any one of the fourth lens E4 to the eighth lens E8 are rotationally symmetrical aspherical surfaces, and the surface shape x of each aspherical lens can be defined by using but not limited to the following aspherical surface formula:

$$x = \frac{ch^2}{1 + \sqrt{1-(k+1)c^2h^2}} + \sum A_i h^i \quad (1)$$

where x is a distance vector height from a vertex of the aspherical surface when the aspherical surface is at a height of h along the optical axis direction; c is paraxial curvature of the aspherical surface, c=1/R (that is, the paraxial curvature c is the reciprocal of the radius of curvature R in Table 1 above); k is a conic coefficient; and Ai is a correction coefficient of an i-th order of the aspherical surface. Higher-order coefficients $A_4, A_6, A_8, A_{10}, A_{12}, A_{14}, A_{16}, A_{18}$ and $A_{20}$ of respective aspheric lens surfaces S7 to S16 that are applicable in Embodiment 1 are given in Table 2 below.

TABLE 2

| Surface No. | A4 | A6 | A8 | A10 | A12 |
|---|---|---|---|---|---|
| S7 | 3.7499E−01 | −1.0735E−01 | −1.3819E−02 | 4.4854E−03 | 1.3337E−02 |
| S8 | −3.5171E−03 | −1.6515E−02 | −4.9454E−03 | 1.0485E−04 | −1.4734E−02 |
| S9 | 7.5192E−02 | 6.7043E−05 | −7.3903E−02 | 6.3693E−03 | −6.1610E−03 |
| S10 | −3.4855E−02 | 1.5745E−02 | −8.6938E−03 | 9.2461E−03 | −5.1079E−03 |
| S11 | −2.1896E−02 | 5.0051E−03 | 1.0048E−02 | 3.8299E−04 | −1.7520E−03 |
| S12 | 1.2949E−01 | −1.7775E−02 | 1.9866E−02 | −1.0396E−03 | −7.2364E−03 |
| S13 | 2.0334E−01 | −1.2798E−02 | −4.3372E−02 | 6.0400E−02 | −1.1218E−02 |
| S14 | −4.4638E−01 | −2.8210E−02 | 5.2939E−02 | 4.7871E−03 | −6.8127E−03 |
| S15 | −8.2922E−01 | −3.0767E−01 | −1.0654E−01 | −3.9401E−02 | −1.5922E−02 |
| S16 | −3.4215E−01 | −2.9675E−02 | 4.0182E−03 | 1.4430E−03 | 0.0000E+00 |

| Surface No. | A14 | A16 | A18 | A20 |
|---|---|---|---|---|
| S7 | −6.0379E−03 | 3.5588E−04 | 0.0000E+00 | 0.0000E+00 |
| S8 | −5.2319E−04 | 3.6646E−03 | 0.0000E+00 | 0.0000E+00 |
| S9 | −1.1517E−03 | 3.2592E−03 | 0.0000E+00 | 0.0000E+00 |
| S10 | 2.0956E−03 | −3.9812E−04 | 0.0000E+00 | 0.0000E+00 |
| S11 | −2.2856E−04 | 7.4558E−04 | 0.0000E+00 | 0.0000E+00 |
| S12 | 6.4046E−03 | −1.4953E−03 | 0.0000E+00 | 0.0000E+00 |
| S13 | −3.1129E−03 | 7.6038E−04 | 0.0000E+00 | 0.0000E+00 |
| S14 | −2.5832E−04 | 8.6514E−04 | 7.0743E−05 | −2.9254E−05 |
| S15 | 7.1549E−03 | 8.3966E−03 | 6.6668E−03 | 8.9772E−03 |
| S16 | 0.0000E+00 | 0.0000E+00 | 0.0000E+00 | 0.0000E+00 |

It can also be seen from Table 1 that both the object side surface and image side surface of any one of the first lens E1 to the third lens E3 are non-rotationally symmetrical aspherical surfaces (i.e., AAS surfaces), and the surface shape of the non-rotationally symmetrical aspherical surface can be defined by using but not limited to the following non-rotationally symmetrical aspherical surface formula:

$$z = \frac{(CUX)x^2 + (CUY)y^2}{1 + \sqrt{1 - (1+KX)(CUX)^2 x^2 - (1+KY)(CUY)^2 y^2}} + \sum AiX \times x^i + \sum AiY \times y^i \quad (2)$$

where z is a vector height of a surface parallel to the Z-axis direction; CUX and CUY are curvatures (the curvature is the reciprocal of the radius of curvature) of a vertex of the surface in the X-axis and Y-axis directions, respectively; KX and KY are conic coefficients in the X-axis and Y-axis directions, respectively; and AiX and AiY are i-th order correction coefficients in rotationally symmetric components of the aspherical surface, respectively. 4-th, 6-th, 8-th, 10-th, 12-th, 14-th, 16-th, 18-th and 20-th order coefficients of rotationally symmetrical component AY, and 4-th, 6-th, 8-th, 10-th, 12-th, 14-th, 16-th, 18-th, and 20-th order coefficients of non-rotationally symmetrical component AX of non-rotationally symmetrical aspherical surfaces S1-S6 that are applicable in Embodiment 1 are given in Tables 3-1 and 3-2 below, respectively.

Figure 2:
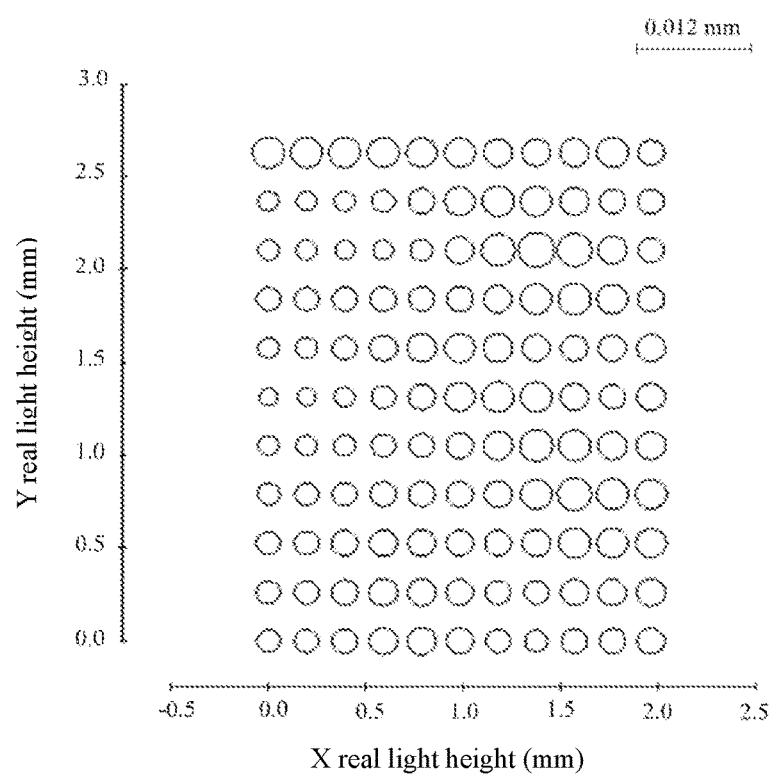
FIG. 2 shows a case where an RMS spot diameter of the optical imaging lens group according to Embodiment 1 of the present application is in a first quadrant.
Figure 3:
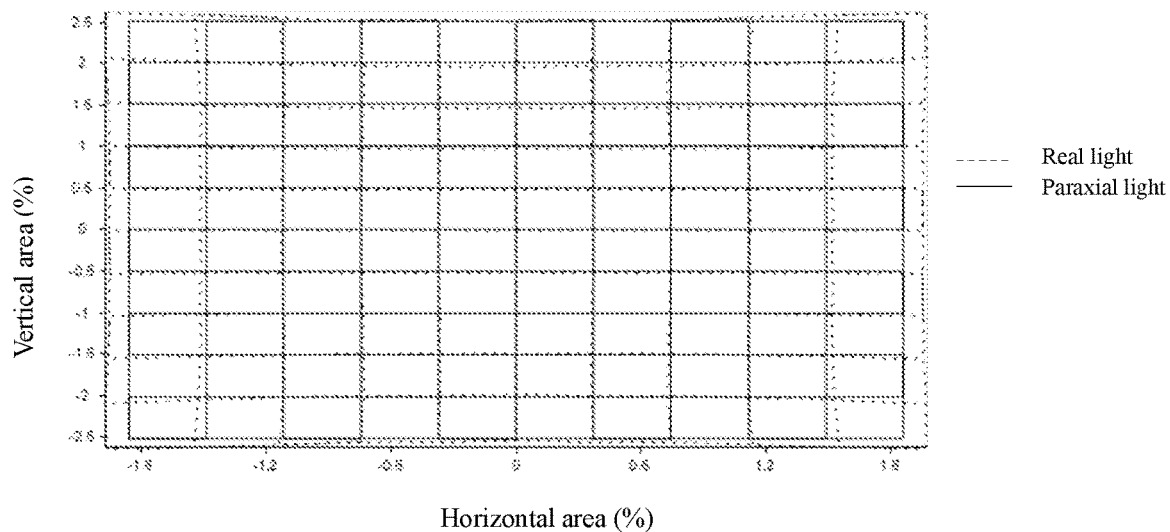
FIG. 3 shows a TV distortion diagram of the optical imaging lens group according to Embodiment 1 of the present application.

FIG. 2 shows a size of an RMS spot diameter of the optical imaging lens group of Embodiment 1 at different image height positions in a first quadrant. FIG. 2 shows a relationship between the RMS spot diameter and a real light image height. In FIG. 2, an X real light height and a Y real light height are both in millimeters (mm), the minimum RMS spot diameter is 0.0018706 mm, the maximum RMS spot diameter is 0.0037517 mm, and an average value of the RMS spot diameter is 0.0027628 mm, and a standard deviation of the RMS spot diameter is 0.00038407 mm. FIG. 3 shows a TV distortion diagram of the optical imaging lens group of Embodiment 1, which represents a difference in distortion between real light and paraxial light in vertical and horizontal areas, wherein the maximum TV distortion in the horizontal area is 3.4532664%, and the maximum TV distortion in the vertical area is 0.64313870%. According to FIGS. 2 and 3, it can be seen that the optical imaging lens group given in Embodiment 1 can achieve good imaging quality.

Embodiment 2

Figure 4:
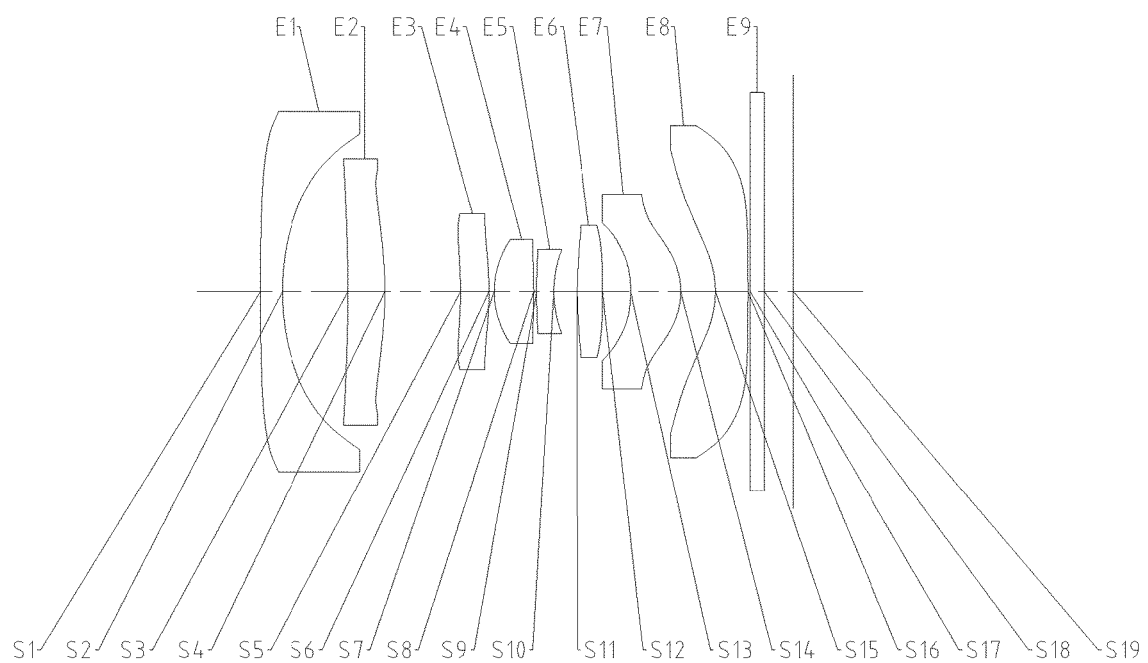
FIG. 4 shows a schematic structural diagram of an optical imaging lens group according to Embodiment 2 of the present application.

An optical imaging lens group according to Embodiment 2 of the present application will be described below with reference to FIGS. 4 to 6. In this embodiment, for the sake of brevity, the description of parts similar to those in Embodiment 1 will be omitted. FIG. 4 shows a schematic structural diagram of the optical imaging lens group according to Embodiment 2 of the present application.

TABLE 3-1

| Surface No. | A4Y | A6Y | A8Y | A10Y | A12Y |
|---|---|---|---|---|---|
| S1 | 1.2168E−03 | 1.7881E−04 | 1.6077E−05 | 1.0141E−07 | −1.6612E−07 |
| S2 | 1.7934E−03 | 8.9981E−04 | 4.3999E−05 | 2.0459E−06 | 1.5631E−06 |
| S3 | 4.7691E−04 | 5.6599E−05 | −1.6264E−05 | −3.7418E−07 | 1.3535E−06 |
| S4 | 2.0494E−04 | 8.8823E−04 | 1.6386E−04 | 1.5629E−05 | 4.2864E−07 |
| S5 | 1.9887E−02 | 8.0237E−03 | 4.7249E−03 | −3.2835E−04 | 5.0999E−04 |
| S6 | 4.6256E−03 | 8.8097E−03 | 6.8585E−03 | 5.0695E−03 | −3.9386E−03 |

| Surface No. | A14Y | A16Y | A18Y | A20Y |
|---|---|---|---|---|
| S1 | −1.6570E−08 | 4.9621E−09 | 0.0000E+00 | 0.0000E+00 |
| S2 | 3.0808E−07 | −1.8966E−07 | 0.0000E+00 | 0.0000E+00 |
| S3 | 3.8116E−07 | −1.7384E−07 | 0.0000E+00 | 0.0000E+00 |
| S4 | 6.4611E−07 | 1.2687E−06 | 0.0000E+00 | 0.0000E+00 |
| S5 | 3.9928E−04 | −2.8439E−04 | 0.0000E+00 | 0.0000E+00 |
| S6 | −1.0751E−03 | 1.7966E−03 | 0.0000E+00 | 0.0000E+00 |

TABLE 3-2

| Surface No. | A4X | A6X | A8X | A10X | A12X |
|---|---|---|---|---|---|
| S1 | 1.9378E−03 | −3.9999E−04 | 2.7199E−05 | 4.3067E−06 | −7.2504E−07 |
| S2 | 2.4933E−03 | −5.4417E−04 | −6.7545E−07 | 1.9663E−05 | −2.4537E−06 |
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |

| Surface No. | A14X | A16X | A18X | A20X |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |

As shown in FIG. 4, the optical imaging lens group includes a first lens E1, a second lens E2, a third lens E3, a fourth lens E4, a fifth lens E5, a sixth lens E6, a seventh lens E7, an eighth lens E8, a filter E9 and an imaging plane S19 in order from an object side to an image side.

The first lens E1 has a negative refractive power, and has a convex object side surface S1 and a concave image side surface S2. The second lens E2 has a positive refractive power, and has a concave object side surface S3 and a convex image side surface S4. The third lens E3 has a positive refractive power, and has a concave object side surface S5 and a convex image side surface S6. The fourth lens E4 has a positive refractive power, and has a convex object side surface S7 and a convex image side surface S8. The fifth lens E5 has a negative refractive power, and has a convex object side surface S9 and a concave image side surface S10. The sixth lens E6 has a positive refractive power, and has a convex object side surface S11 and a convex image side surface S12. The seventh lens E7 has a positive refractive power, and has a concave object side surface S13 and a convex image side surface S14. The eighth lens E8 has a negative refractive power, and has a concave object side surface S15 and a convex image side surface S16. The filter E9 has an object side surface S17 and an image side surface S18. Light from an object sequentially passes through the respective surfaces S1 to S18 and finally forms an image on the imaging plane S19.

In this example, a total effective focal length fx of the optical imaging lens group in the X-axis direction is 3.94 mm, a total effective focal length fy of the optical imaging lens group in the Y-axis direction is 3.00 mm, and a distance TTL from the object side surface S1 of the first lens E1 to the imaging plane S19 of the optical imaging lens group on the optical axis is 8.06 mm.

Table 4 shows a table of basic parameters of the optical imaging lens group of Embodiment 2, wherein the units of the radius of curvature Y, radius of curvature X, thickness/distance, and focal length Y are all millimeters (mm). Table 5 shows higher-order coefficients of each rotationally symmetrical aspherical surface that are applicable in Embodiment 2, wherein the surface shape of each rotationally symmetrical aspherical surface can be defined by formula (1) given in Embodiment 1 described above. Tables 6-1 and 6-2 show high-order coefficients of the rotationally symmetrical component and the non-rotationally symmetrical component of non-rotationally symmetrical aspherical surfaces that are applicable in Embodiment 2, respectively, wherein the surface shape of the non-rotationally symmetrical aspherical surface can be defined by formula (2) given in Embodiment 1 described above.

TABLE 4

| Surface No. | Surface type | Radius of curvature Y | Radius of curvature X | Thickness/ distance | Material Refractive index | Material Dispersion coefficient | Focal length Y | Conic coefficient Y | Conic coefficient X |
|---|---|---|---|---|---|---|---|---|---|
| OBJ | Spherical | Infinity | | Infinity | | | | | |
| S1(AAS) | Aspherical | 71.5866 | Infinity | 0.3334 | 1.510 | 68.17 | −7.83 | 574.1109 | 0.0000 |
| S2(AAS) | Aspherical | 3.7765 | Infinity | 0.9975 | | | | 0.0935 | 0.0000 |
| S3(AAS) | Aspherical | −23.0370 | Infinity | 0.5569 | 1.669 | 32.5 | 12.57 | −148.0749 | 0.0000 |
| S4(AAS) | Aspherical | −6.2172 | Infinity | 1.1415 | | | | −21.3316 | 0.0000 |
| S5(AAS) | Aspherical | −5.9357 | Infinity | 0.4288 | 1.647 | 51.56 | 40.79 | −43.6301 | 0.0000 |
| S6(AAS) | Aspherical | −4.9835 | Infinity | 0.0800 | | | | −28.1451 | 0.0000 |
| S7 | Aspherical | 1.5198 | | 0.5947 | 1.545 | 65.14 | 2.19 | 0.0000 | |
| S8(STO) | Aspherical | −37.3138 | | 0.0432 | | | | 0.0000 | |
| S9 | Aspherical | 27.4785 | | 0.2603 | 1.672 | 32.22 | −2.90 | 0.0000 | |
| S10 | Aspherical | 1.6822 | | 0.3545 | | | | 0.0000 | |
| S11 | Aspherical | 7.3267 | | 0.3894 | 1.572 | 62.26 | 8.56 | 0.0000 | |
| S12 | Aspherical | −4.6381 | | 0.4235 | | | | 0.0000 | |
| S13 | Aspherical | −1.3186 | | 0.7568 | 1.546 | 54.08 | 3.6 | 0.0000 | |
| S14 | Aspherical | −1.8997 | | 0.5251 | | | | 0.0000 | |
| S15 | Aspherical | −5.0805 | | 0.4784 | 1.515 | 57.68 | −2.55 | 0.0000 | |
| S16 | Aspherical | −6.4283 | | 0.0460 | | | | 0.0000 | |
| S17 | Spherical | Infinity | | 0.2100 | 1.518 | 64.17 | | | |
| S18 | Spherical | Infinity | | 0.4400 | | | | | |
| S19 | Spherical | Infinity | | | | | | | |

TABLE 5

| Surface No. | A4 | A6 | A8 | A10 | A12 |
|---|---|---|---|---|---|
| S7 | 3.7487E−01 | −1.0753E−01 | −1.4102E−02 | 4.3097E−03 | 1.3354E−02 |
| S8 | −4.1268E−03 | −1.7029E−02 | −5.7894E−03 | −7.2983E−04 | −1.5213E−02 |
| S9 | 7.4965E−02 | 4.3408E−05 | −7.3389E−03 | 6.3834E−03 | −6.2436E−03 |
| S10 | −3.4401E−02 | 1.5932E−02 | −8.5949E−03 | 9.3664E−03 | −4.9883E−03 |
| S11 | −2.0749E−02 | 5.2564E−03 | 1.0073E−02 | 3.0080E−04 | −1.6678E−03 |
| S12 | 1.3118E−01 | −1.6774E−02 | 2.0717E−02 | −5.5444E−04 | −7.0103E−03 |
| S13 | 1.9478E−01 | −1.4418E−02 | −4.0857E−02 | 6.1619E−02 | −1.2459E−02 |
| S14 | −4.4358E−01 | −2.7162E−02 | 5.1231E−02 | 4.6566E−03 | −6.7877E−03 |
| S15 | −6.8444E−01 | −2.3529E−01 | −1.0084E−01 | −3.2573E−02 | −6.3053E−03 |
| S16 | 3.7072E−01 | 2.2937E−02 | −3.7010E−03 | 4.4320E−04 | −1.7677E−04 |

TABLE 5-continued

| Surface No. | A14 | A16 | A18 | A20 |
|---|---|---|---|---|
| S7 | −5.8745E−03 | 3.3337E−04 | 0.0000E+00 | 0.0000E+00 |
| S8 | −5.2163E−04 | 3.7521E−03 | 0.0000E+00 | 0.0000E+00 |
| S9 | −1.2720E−03 | 3.3075E−03 | 0.0000E+00 | 0.0000E+00 |
| S10 | 1.9910E−03 | −3.3825E−04 | 0.0000E+00 | 0.0000E+00 |
| S11 | 1.1982E−04 | 5.3049E−04 | 0.0000E+00 | 0.0000E+00 |
| S12 | 5.8986E−03 | −1.3534E−03 | 0.0000E+00 | 0.0000E+00 |
| S13 | −2.6767E−03 | 6.8477E−04 | 0.0000E+00 | 0.0000E+00 |
| S14 | −2.8938E−04 | 8.8063E−04 | 7.3405E−05 | −3.1157E−05 |
| S15 | 8.4157E−03 | 6.9194E−03 | 9.4418E−04 | 1.1338E−02 |
| S16 | 1.6630E−05 | −2.1581E−06 | 2.6918E−07 | 0.0000E+00 |

TABLE 6-1

| Surface No. | A4Y | A6Y | A8Y | A10Y | A12Y |
|---|---|---|---|---|---|
| S1 | 1.3600E−03 | 1.7632E−04 | 1.5900E−05 | 8.1273E−08 | −1.6894E−07 |
| S2 | 1.1234E−03 | 1.0177E−03 | 5.9299E−05 | 4.2664E−06 | 2.0696E−06 |
| S3 | 3.7899E−04 | 4.1575E−05 | −1.6678E−05 | −7.7658E−07 | 1.1573E−06 |
| S4 | 3.2141E−04 | 8.6195E−04 | 1.4794E−04 | 1.2365E−05 | 2.1385E−07 |
| S5 | 1.9765E−02 | 7.5986E−03 | 4.4465E−03 | −4.5521E−04 | 4.674 IE−04 |
| S6 | 4.0852E−03 | 8.1829E−03 | 6.1711E−03 | 4.5349E−03 | −4.1290E−03 |

| Surface No. | A14Y | A16Y | A18Y | A20Y |
|---|---|---|---|---|
| S1 | −1.6358E−08 | 5.2428E−09 | 0.0000E+00 | 0.0000E+00 |
| S2 | 4.5155E−07 | −1.5037E−07 | 0.0000E+00 | 0.0000E+00 |
| S3 | 3.6165E−07 | −1.4582E−07 | 0.0000E+00 | 0.0000E+00 |
| S4 | 7.1853E−07 | 1.2658E−06 | 0.0000E+00 | 0.0000E+00 |
| S5 | 4.1128E−04 | −2.2487E−04 | 0.0000E+00 | 0.0000E+00 |
| S6 | −9.2514E−04 | 2.1563E−03 | 0.0000E+00 | 0.0000E+00 |

TABLE 6-2

| Surface No. | A4X | A6X | A8X | A10X | A12X |
|---|---|---|---|---|---|
| S1 | 1.7810E−03 | −4.0210E−04 | 2.6953E−05 | 4.5549E−06 | −6.3359E−07 |
| S2 | 2.2866E−03 | −5.4407E−04 | 2.4236E−06 | 1.9997E−05 | −2.3478E−06 |
| S3 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |

| Surface No. | A14X | A16X | A18X | A20X |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |

Figure 5:
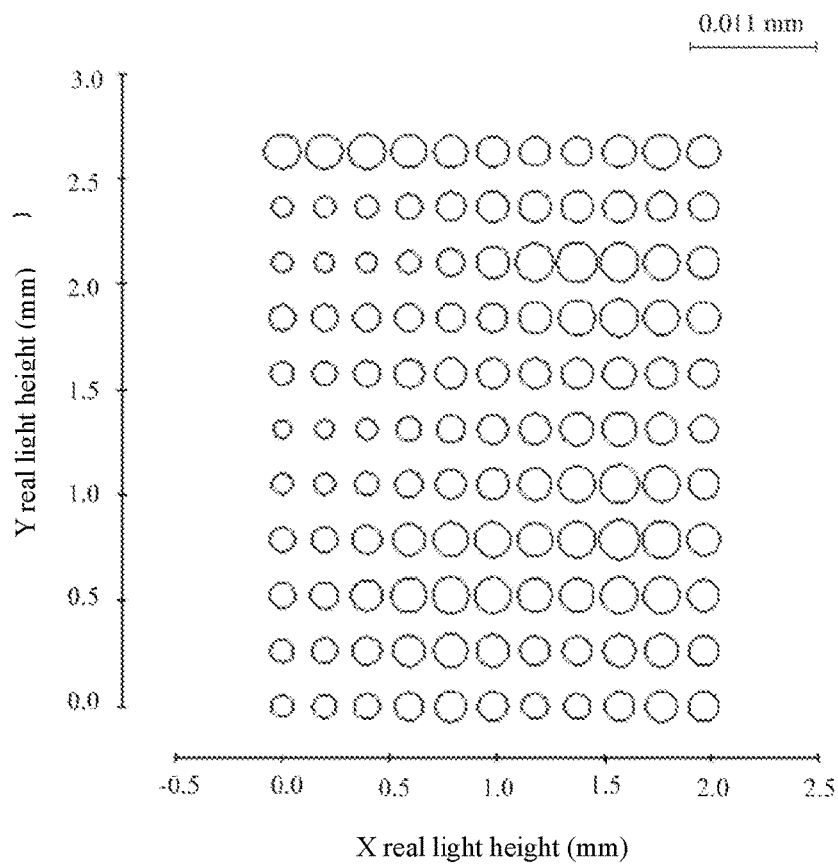
FIG. 5 shows a case where an RMS spot diameter of the optical imaging lens group according to Embodiment 2 of the present application is in a first quadrant.
Figure 6:
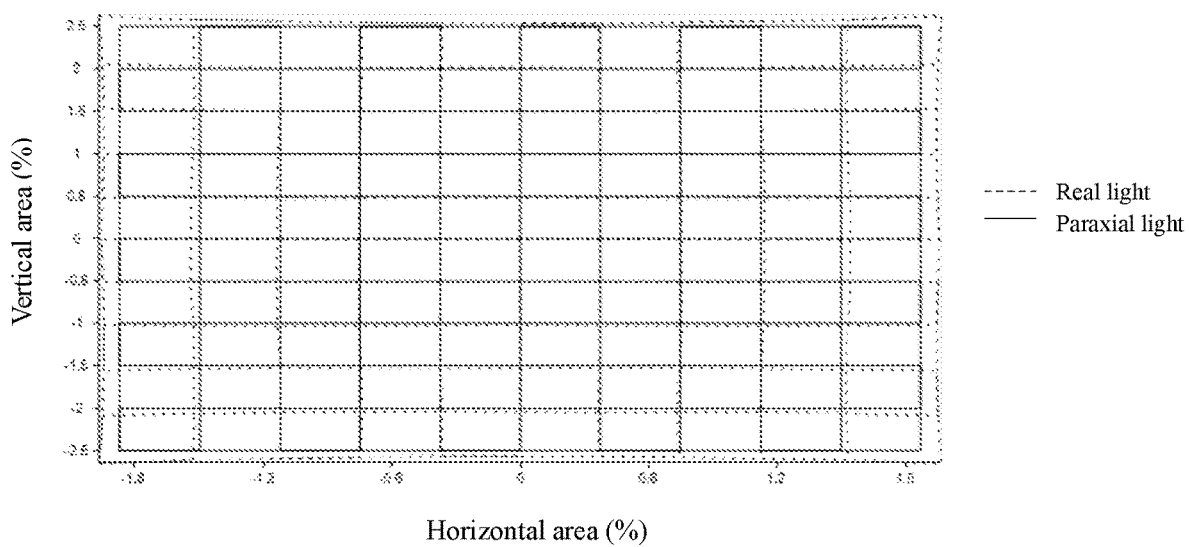
FIG. 6 shows a TV distortion diagram of the optical imaging lens group according to Embodiment 2 of the present application.

FIG. 5 shows a size of an RMS spot diameter of the optical imaging lens group of Embodiment 2 at different image height positions in a first quadrant. FIG. 5 shows a relationship between the RMS spot diameter and a real light image height. In FIG. 5, an X real light height and a Y real light height are both in millimeters (mm), the minimum RMS spot diameter is 0.0015864 mm, the maximum RMS spot diameter is 0.0034325 mm, and an average value of the RMS spot diameter is 0.0025729 mm, and a standard deviation of the RMS spot diameter is 0.00043105 mm. FIG. 6 shows a TV distortion diagram of the optical imaging lens group of Embodiment 2, which represents a difference in distortion between real light and paraxial light in vertical and horizontal areas, wherein the maximum TV distortion in the horizontal area is 3.0114838%, and the maximum TV distortion in the vertical area is 0.50480041%. According to FIGS. 5 and 6, it can be seen that the optical imaging lens group given in Embodiment 2 can achieve good imaging quality.

In summary, Embodiments 1 to 2 satisfy the relationships shown in Table 7, respectively.

TABLE 7

| Conditional expression\Embodiment | 1 | 2 |
|---|---|---|
| $\sqrt{IH_x^2 + IH_y^2}$ (mm) | 3.28 | 3.28 |
| tan(HFOVy)/tan(HFOVx) | 1.74 | 1.78 |
| (DT11-DT42)/(DT82-DT42) | 1.13 | 1.11 |
| (N2 + N3)/2 | 1.65 | 1.66 |
| \|V2 − V3\| | 16.57 | 19.06 |
| (V6 + V7 + V8)/3 | 54.73 | 58.01 |
| (N6 + N7 + N8)/3 | 1.55 | 1.54 |

TABLE 7-continued

| Conditional expression\Embodiment | 1 | 2 |
|---|---|---|
| f1y/fy | -2.69 | -2.61 |
| f6y/f4y | 4.13 | 3.90 |
| f1y/f8y | 3.62 | 3.07 |
| fx/fy | 1.27 | 1.31 |

The present application further provides an imaging device, of which an electronic photosensitive element may be a Charge-Coupled Device (CCD) or a Complementary Metal Oxide Semiconductor element (CMOS). The imaging device may be an independent imaging device such as a digital camera, or may be an imaging module integrated in a mobile electronic device such as a mobile phone. The imaging device is equipped with the optical imaging lens group described above.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. An optical imaging lens group, comprising a first lens, a second lens, a third lens, a fourth lens, a fifth lens, a sixth lens, a seventh lens and an eighth lens having refractive powers in order from an object side to an image side along an optical axis, wherein
    the first lens has a negative refractive power;
    the fourth lens has a positive refractive power;
    the eighth lens has a negative refractive power;
    at least one of the first lens to the eighth lens has a non-rotationally symmetrical aspherical lens surface; and
    wherein an effective focal length f4y of the fourth lens in a Y-axis direction of the optical imaging lens group and an effective focal length f6y of the sixth lens in the Y-axis direction satisfy: 3.5<f6y/f4y<5.0.

2. The optical imaging lens group according to claim 1, wherein an image height IHx in an X-axis direction of the optical imaging lens group and an image height IHy in the Y-axis direction of the optical imaging lens group satisfy: $\sqrt{IH_x^2+IH_y^2} \leq 4.0$ mm.

3. The optical imaging lens group according to claim 1, wherein a semi-field of view Semi-FOVx in an X-axis direction of the optical imaging lens group and a semi-field of view Semi-FOVy in the Y-axis direction of the optical imaging lens group satisfy: tan(Semi-FOVy)/tan(Semi-FOVx)<2.0.

4. The optical imaging lens group according to claim 2, wherein values of effective radii of respective lens surfaces of an object side surface of the first lens to an image side surface of the fourth lens in the Y-axis direction of the optical imaging lens group decrease in order; and
    values of effective radii of respective lens surfaces of the image side surface of the fourth lens to an image side surface of the eighth lens in the Y-axis direction of the optical imaging lens group increase in order.

5. The optical imaging lens group according to claim 2, wherein a maximum effective radius DT11 of an object side surface of the first lens in the Y-axis direction of the optical imaging lens group, a maximum effective radius DT42 of an image side surface of the fourth lens in the Y-axis direction of the optical imaging lens group and an effective radius DT82 of an image side surface of the eighth lens satisfy: 1<(DT11−DT42)/(DT82−DT42)≤1.2.

6. The optical imaging lens group according to claim 2, wherein a refractive index N2 of the second lens in the Y-axis direction of the optical imaging lens group and a refractive index N3 of the third lens in the Y-axis direction of the optical imaging lens group satisfy: 1.6<(N2+N3)/2<1.7.

7. The optical imaging lens group according to claim 2, wherein an Abbe number V2 of the second lens in the Y-axis direction of the optical imaging lens group and an Abbe number V3 of the third lens in the Y-axis direction of the optical imaging lens group satisfy: |V2−V3|≤20.

8. The optical imaging lens group according to claim 7, wherein an Abbe number V6 of the sixth lens in the Y-axis direction of the optical imaging lens group, an Abbe number V7 of the seventh lens in the Y-axis direction of the optical imaging lens group and an Abbe number V8 of the eighth lens in the Y-axis direction of the optical imaging lens group satisfy: 50<(V6+V7+V8)/3<60.

9. The optical imaging lens group according to claim 8, wherein a refractive index N6 of the sixth lens in the Y-axis direction of the optical imaging lens group, a refractive index N7 of the seventh lens in the Y-axis direction of the optical imaging lens group and a refractive index N8 of the eighth lens in the Y-axis direction of the optical imaging lens group satisfy: 1.5<(N6+N7+N8)/3<1.6.

10. The optical imaging lens group according to claim 1, wherein an effective focal length f1y of the first lens in the Y-axis direction and a total effective focal length fy of the optical imaging lens group in the Y-axis direction satisfy: −3.0<f1y/fy<−2.0.

11. An optical imaging lens group, comprising a first lens, a second lens, a third lens, a fourth lens, a fifth lens, a sixth lens, a seventh lens and an eighth lens having refractive powers in order from an object side to an image side along an optical axis, wherein
    the first lens has a negative refractive power;
    the fourth lens has a positive refractive power;
    the eighth lens has a negative refractive power;
    at least one of the first lens to the eighth lens has a non-rotationally symmetrical aspherical lens surface; and
    an image height IHx in an X-axis direction of the optical imaging lens group and an image height IHy in a Y-axis direction of the optical imaging lens group satisfy: $\sqrt{IH_x^2+IH_y^2} \leq 4.0$ mm;
    wherein a maximum effective radius DT11 of an object side surface of the first lens in the Y-axis direction of the optical imaging lens group, a maximum effective radius DT42 of an image side surface of the fourth lens in the Y-axis direction of the optical imaging lens group and an effective radius DT82 of an image side surface of the eighth lens satisfy: 1<(DT11−DT42)/(DT82−DT42)≤1.2.

12. The optical imaging lens group according to claim 11, wherein a semi-field of view Semi-FOVx in the X-axis direction of the optical imaging lens group and a semi-field of view Semi-FOVy in the Y-axis direction of the optical imaging lens group satisfy: tan(Semi-FOVy)/tan(Semi-FOVx)<2.0.

13. The optical imaging lens group according to claim 11, wherein values of effective radii of respective lens surfaces of the object side surface of the first lens to the image side surface of the fourth lens in the Y-axis direction of the optical imaging lens group decrease in order; and
values of effective radii of respective lens surfaces of the image side surface of the fourth lens to the image side surface of the eighth lens in the Y-axis direction of the optical imaging lens group increase in order.

14. The optical imaging lens group according to claim 11, wherein a refractive index N2 of the second lens in the Y-axis direction of the optical imaging lens group and a refractive index N3 of the third lens in the Y-axis direction of the optical imaging lens group satisfy: 1.6<(N2+N3)/2<1.7.

15. The optical imaging lens group according to claim 11, wherein an Abbe number V2 of the second lens in the Y-axis direction of the optical imaging lens group and an Abbe number V3 of the third lens in the Y-axis direction of the optical imaging lens group satisfy: |V2−V3|≤20.

16. The optical imaging lens group according to claim 15, wherein an Abbe number V6 of the sixth lens in the Y-axis direction of the optical imaging lens group, an Abbe number V7 of the seventh lens in the Y-axis direction of the optical imaging lens group and an Abbe number V8 of the eighth lens in the Y-axis direction of the optical imaging lens group satisfy: 50<(V6+V7+V8)/3<60.

17. The optical imaging lens group according to claim 16, wherein a refractive index N6 of the sixth lens in the Y-axis direction of the optical imaging lens group, a refractive index N7 of the seventh lens in the Y-axis direction of the optical imaging lens group and a refractive index N8 of the eighth lens in the Y-axis direction of the optical imaging lens group satisfy: 1.5<(N6+N7+N8)/3<1.6.

18. The optical imaging lens group according to claim 11, wherein an effective focal length f1y of the first lens in the Y-axis direction and a total effective focal length fy of the optical imaging lens group in the Y-axis direction satisfy: −3.0<f1y/fy<−2.0.

* * * * *